United States Patent [19]

Ishida et al.

[11] Patent Number: 4,558,269
[45] Date of Patent: Dec. 10, 1985

[54] INDUCTION MOTOR DRIVE APPARATUS

[75] Inventors: Hiroshi Ishida, Tokyo; Yoshiki Fujioka, Higashiyamoto; Naoto Ota, Hino, all of Japan

[73] Assignee: Fanuc Ltd, Minamitsuru, Japan

[21] Appl. No.: 453,895

[22] PCT Filed: Apr. 22, 1982

[86] PCT No.: PCT/JP82/00137
§ 371 Date: Dec. 14, 1982
§ 102(e) Date: Dec. 14, 1982

[87] PCT Pub. No.: WO 83/0392
PCT Pub. Date: Nov. 10, 1983

[51] Int. Cl.$^4$ .............................................. H02P 5/34
[52] U.S. Cl. .................................. 318/811; 318/802; 318/806
[58] Field of Search ............................ 318/798-803, 318/805, 811, 806-810, 721-724

[56] References Cited

U.S. PATENT DOCUMENTS

| | | | |
|---|---|---|---|
| 4,099,109 | 7/1978 | Abbondanti | 318/811 |
| 4,266,176 | 5/1981 | Fulton | 318/801 |
| 4,357,569 | 11/1982 | Iwakane | 318/798 X |
| 4,361,794 | 11/1982 | Kawada | 318/800 |
| 4,364,109 | 12/1982 | Okado | 318/811 X |
| 4,377,779 | 3/1983 | Plunkett | 318/802 X |
| 4,384,244 | 5/1983 | Matsumoto | 318/803 |
| 4,456,868 | 6/1984 | Yamamura | 318/809 X |

FOREIGN PATENT DOCUMENTS

| | | |
|---|---|---|
| 0051478 | 5/1982 | European Pat. Off. . |
| 0069469 | 1/1983 | European Pat. Off. . |
| 2855734 | 6/1979 | Fed. Rep. of Germany . |
| 2091903 | 1/1972 | France . |
| 2048516 | 12/1980 | United Kingdom . |

OTHER PUBLICATIONS

Patent Abstracts of Japan, vol. 7, No. 8, Jan. 13, 1983, p. (E-152) (1153)-for Japanese Pat. No. 57-166890.
Supplementary European Search Report, the Hague, Jul. 20, 1984, Examiner: Houillon.

*Primary Examiner*—William M. Shoop, Jr.
*Assistant Examiner*—Patrick C. Keane
*Attorney, Agent, or Firm*—Staas & Halsey

[57] ABSTRACT

Disclosed is an induction motor drive apparatus which produces three-phase current commands using a speed error (ER) between a speed command and an actual speed (n) for driving an induction motor (10) on the basis of the current commands. The induction motor drive apparatus receives the speed error (ER) and the actual speed (n) as input signals and generates, through digital processing, a first phase sinusoidal signal and a second phase sinusoidal signal shifted by $2\pi/3$ from the first phase sinusoidal signal. The first and second sinusoidal signals are used for generating a phase current ($i_w$) in a first and second phase currents ($i_u$, $i_v$) which are in turn used to generate a third phase current ($i_w$) such that the first, second and third phase current commands will have a sum equal to zero.

3 Claims, 8 Drawing Figures

INDUCTION MOTOR DRIVE APPARATUS

BACKGROUND OF THE INVENTION

This invention relates to an induction motor drive apparatus and, more particularly, to an induction motor drive apparatus which produces three-phase current commands through digital processing executed by use of a microcomputer.

Proposed methods of controlling induction motors include a so-called vector control method and field acceleration control method. Using such methods of control, the primary current of an induction motor can be controlled in terms of the instantaneous magnitude thereof to enable fine control having comparatively good response.

Figure 1:
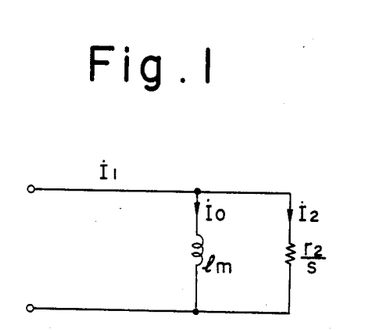
FIG. 1 is an equivalent circuit diagram of an induction motor used in describing vector control.

FIG. 1 shows an equivalent circuit of an induction motor and is useful for describing vector control. In FIG. 1, $l_m$ denotes excitation reactance, $r_2$ represents equivalent resistance, and s designates slip. If we consider the equivalent circuit of the induction motor in this fashion, the generated torque T will be expressed by:

$$T = 3 \frac{r_2 I_2}{s \cdot \omega_s} I_2 \tag{1}$$

Note that $\omega_s$ represents the slip frequency. If we assume that $I_2$ is proportional to $s \cdot \omega_s$, then the torque T will be proportional to the secondary current and will have a torque generating mechanism similar to that of a DC motor. The following will hold from FIG. 1:

$$\omega_s \cdot l_m \cdot I_o = \frac{r_2 \cdot I_2}{s} \tag{2}$$

$$\therefore s \cdot \omega_s = \frac{r_2 I_2}{l_m I_o}$$

Accordingly, to make $I_2$ and $s \cdot \omega_s$ proportional to each other, the excitation current $I_o$ must be made a constant quantity.

Therefore, according to vector control, the excitation current $I_o$ is held constant and only the secondary current $I_2$ is varied, in proportion to the load torque, while perpendicularity between the excitation current $I_o$ and secondary current $I_2$ is maintained. Also, since an error (speed error) ER between a commanded speed and the actual speed may be regarded as a torque command, the primary current $I_1$ is defined so as to satisfy the following, in accordance with the speed error ER:

$$I_1 = I_o + j \cdot k \cdot ER \tag{3}$$

Figure 2:
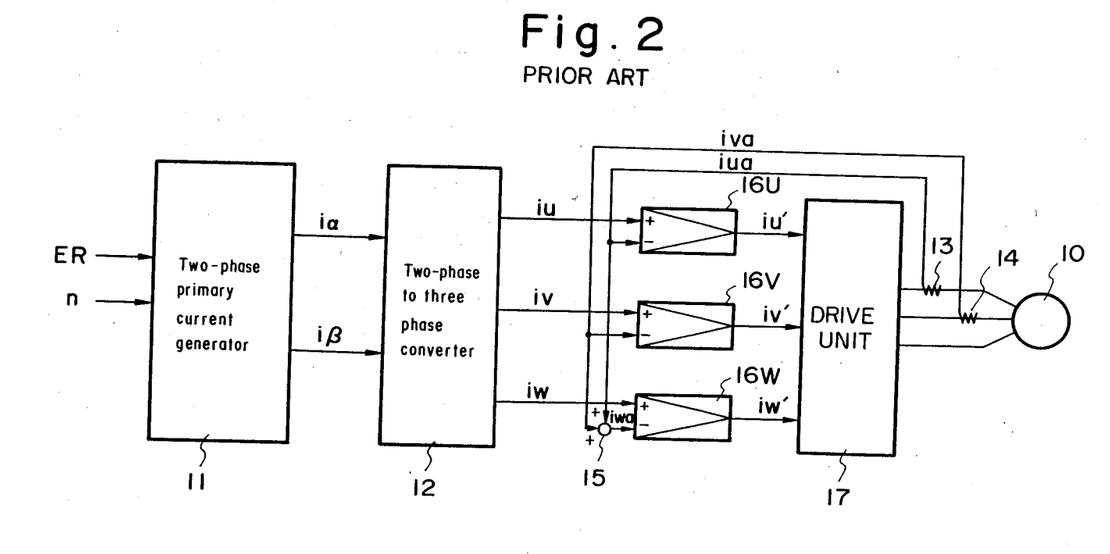
FIG. 2 is a block diagram of a conventional system.
Figure 3:
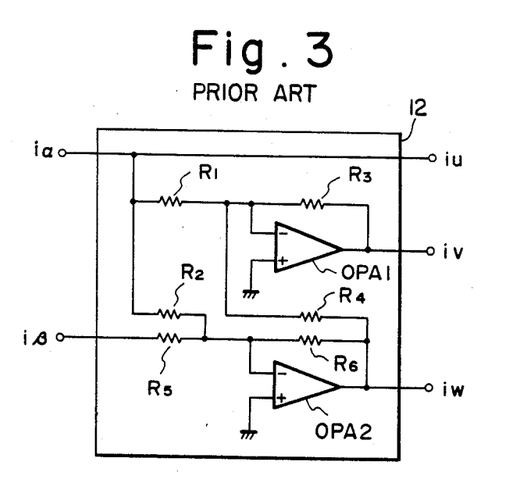
FIG. 3 is a circuit diagram for a two-phase to three-phase converter.

In the prior art, the primary current is generated in accordance with the following method. Specifically, the method includes generating mutually perpendicular, two-phase primary current commands $i\alpha$ and $i\beta$ in accordance with the speed error ER and actual speed n, and converting these two-phase primary current commands $i\alpha$ and $i\beta$ into three-phase commands through the use of a two-phase to three-phase converter, whereby three-phase primary current commands $i_u$, $i_v$ and $i_w$ are generated. FIG. 2 is a block diagram of an example of the prior art, in which numeral 10 denotes an induction motor, 11 a two-phase primary current generator for generating current commands $i\alpha$ and $i\beta$ of an amplitude and frequency which conform to the speed error ER and actual speed n, and 12 a two-phase to three-phase converter. As illustrated in FIG. 3, the two-phase to three-phase converter 12 is composed of resistors $R_1$ through $R_4$ each having a resistance of 20 KΩ, a resistor $R_5$ of 11.55 KΩ, a resistor $R_6$ of 10 KΩ, and operational amplifiers $OPA_1$ and $OPA_2$. In accordance with the resistance values set in this fashion, the two-phase to three-phase converter 12 performs the following vector operations to convert the mutually perpendicular two-phase currents into three-phase currents:

$$i_u = i\alpha \tag{4}$$

$$i_v = \frac{-1}{2} i\alpha + \sqrt{\frac{3}{2}} i\beta \tag{5}$$

$$i_w = \frac{-1}{2} i\alpha - \sqrt{\frac{3}{2}} i\beta \tag{6}$$

Returning to FIG. 2, numerals 13 and 14 denote current transformers for sensing phase currents $i_{ua}$ and $i_{va}$ which flow in the U and V phases of the three-phase induction motor 10, respectively, and numeral 15 denotes an arithmetic circuit which performs the following addition operation for producing a phase current $i_{wa}$ to flow in the W phase of the induction motor 10:

$$-(i_{ua} + i_{va}) \rightarrow i_{wa}$$

Numerals 16U, 16V and 16W designate current control circuits, corresponding to each of the three phases, for computing and then amplifying current differences $(i_u - i_{ua})$, $(i_v - i_{va})$ and $(i_w - i_{wa})$. Numeral 17 denotes a drive unit which includes a pulse-width modulator and an inverter comprising transistors.

Figure 4:
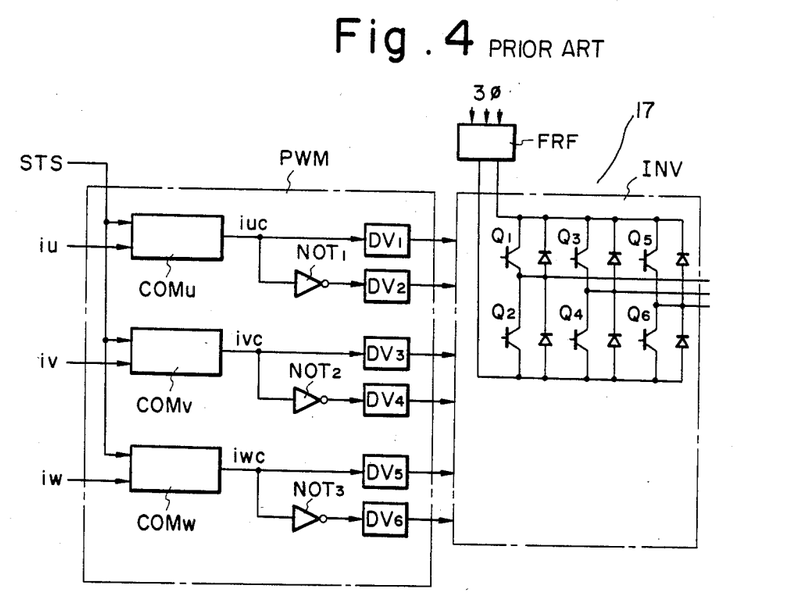
FIG. 4 is a block diagram of a drive unit.

As illustrated in FIG. 4, the pulse-width modulator PWM in the drive unit 17 includes comparators $COM_u$, $COM_v$, $COM_w$, NOT gates $NOT_1$ through $NOT_3$, and drivers $DV_1$ through $DV_6$, and the inverter INV includes six power transistors $Q_1$ through $Q_6$ and six diodes $D_1$ through $D_6$. The drive unit 17 also includes a three-phase full-wave rectifier FRF. The comparators $COM_u$, $COM_v$ and $COM_w$ compare a sawtooth signal STS, generated by a sawtooth waveform generating circuit which is not shown, with the amplitudes of three-phase alternating current signals $i_u'$, $i_v'$ and $i_w'$, respectively, and produce and output with a logical value of "1" when the magnitude of STS is exceeded by $i_u'$, $i_v'$ or $i_w'$, and a logic value of "0" when the magnitude of STS is greater. Thus, the comparators produce the pulse-width modulated three-phase current commands $i_{uc}$, $i_{vc}$ and $i_{wc}$ dependent upon the amplitudes of $i_u'$, $i_v'$ and $i_w'$. The NOT gates $NOT_1$ through $NOT_3$ and drivers $DV_1$ through $DV_6$ convert these current commands $i_{uc}$, $i_{vc}$ and $i_{wc}$ into drive signals $SQ_1$ through $SQ_6$ to control the on/off action of each of the power transistors $Q_1$ through $Q_6$ comprising the inverter INV.

The foregoing conventional method has the following defects:

(1) a computation error is generated in effecting the conversion from the orthogonal two-phase system to the three-phase system;

(2) due to the computation error, the relation $i_u + i_v + i_w = 0$ does not hold, giving rise to a periodic undulation dependent upon motor rotation; and (3) a function generator for generating primary currents in two phases [sin $\theta$ and sin $(\theta + \pi)$] and a two-phase to three-phase converter, etc., are required, thereby complicating the circuitry and raising the cost.

Another method of generating primary currents in three phases is to generate the following digitally in accordance with the speed error ER and actual speed n:

$$\sin(\omega_n t + \omega_s t + \phi) \quad (7)$$

$$\sin(\omega_n t + \omega_s t + \phi + 2\pi/3) \quad (8)$$

$$\sin(\omega_n t + \omega_s t + \phi + 4\pi/3) \quad (9)$$

Figure 5:
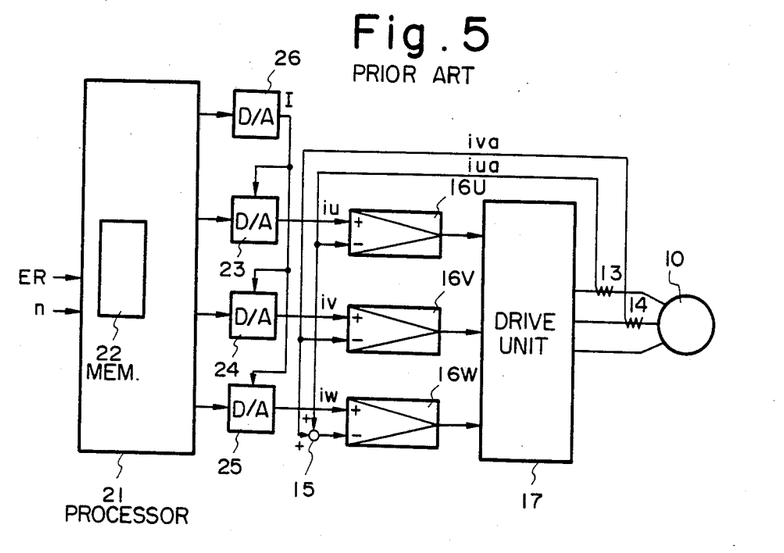
FIG. 5 is a block diagram of another conventional system.

According to this method, a $\theta$-sin $\theta$ characteristic, $\theta$-sin $(\theta + 2\pi/3)$ characteristic and $\theta$-sin $(\theta + 4\pi/3)$ characteristic are stored beforehand in the form of a table in a memory 22 located internally of a processor 21, illustrated in FIG. 5. The processor computes the values of $\theta = \omega_n \cdot t + \omega_s \cdot t + \phi$ (where $\omega_n$ represents angular frequency, which is proportional to the rotational speed of the induction motor, $\omega_s$ represents slip frequency, and $\phi$ represents phase difference), sin $\theta$, sin $(\theta + 2\pi/3)$ and sin $(\theta + 4\pi/3)$. These values are applied as input signals to multiplying-type DA converters (sold under the nomenclature "DAC 08", manufactured by National Semiconductor Corporation) 23, 24 and 25. Also stored previously in the memory 22 is a relation (S-I characteristic) between the slip s and the primary current amplitude. A digital primary current I, dependent upon the slip s, is generated based on this relation and is applied to a DA converter 26 as an input signal. The output of the DA converter 26 is applied as an input to each of the multiplying-type DA converters 23, 24 and 25 which then produce the following as respective output signals:

$$i_u = I \cdot \sin\theta, \quad i_v = I \cdot \sin(\theta + 2\pi/3), \quad i_w = I \cdot \sin(\theta + 4\pi/3)$$

In FIG. 5, portions similar to those shown in FIG. 2 are designated by like reference characters and a detailed description thereof will not be provided.

The above mentioned, however, possesses the following defects:

(1) the relation $i_u + i_v + i_w = 0$ is not produced with accuracy, resulting in a periodic undulation, and (2) tables and DA converters are required for all three phases, thereby raising cost.

SUMMARY OF THE INVENTION

Accordingly, an object of the present invention is to provide an induction motor drive apparatus which enables the relation $i_u + i_v + i_w = 0$ to be established with accuracy, which eliminates periodic undulation and which is possessed of simple circuitry.

The present invention discloses an induction motor drive apparatus which produces three-phase current commands using a speed error between a speed command and an actual speed for driving an induction motor on the basis of the current commands. The induction motor drive apparatus receives the speed error and the actual speed as input signals for generating, through digital processing, first and second phase sinusoidal signals from which first and second phase currents are generated. A third phase current is generated, using the first and second phase currents. The third phase current $i_w$ is generated to satisfy the relation $i_u + i_v + i_w = 0$, therefore fluctuation and periodic undulation dependent upon motor rotation does not occur. A reduction in the number of circuit components also is achieved.

DESCRIPTION OF THE PREFERRED EMBODIMENTS

Figure 6:
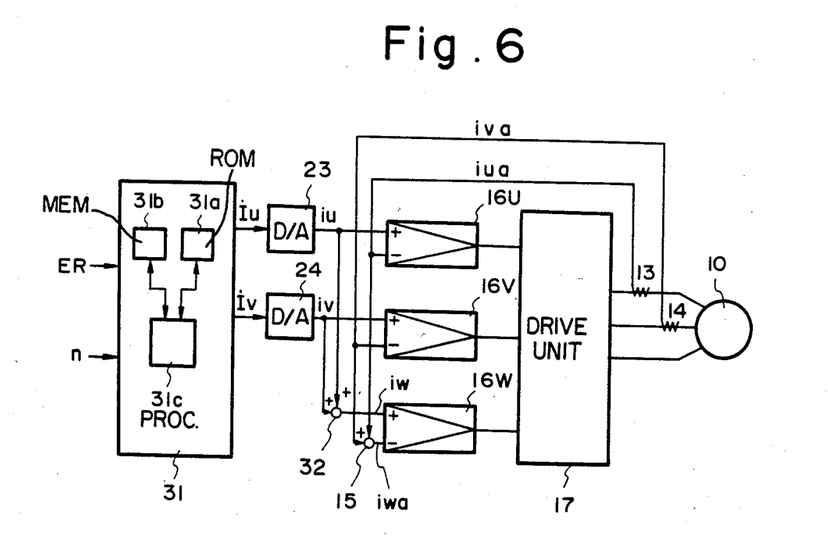
FIG. 6 is a block diagram of an embodiment of the present invention.

An embodiment of the present invention will now be described in detail with reference to the drawings. FIG. 6 is a view of an arrangement embodying the present invention. Numeral 31 denotes a current command generating unit, provided by a microcomputer, for generating two-phase current commands $I_U$ and $I_V$ by digital processing. The current command generating unit 31 includes a data memory (ROM) 31a for storing various characteristics such as the $\theta$-sin $\theta$ characteristic and the S-I characteristic, a control program memory 31b, and a processor or arithmetic unit 31c, etc. Upon receiving a speed error signal ER and actual speed n as input signals thereto, the processor 31c, under the control of the control program, finds $\theta$, then proceeds to read sin $\theta$ and the primary current amplitude I out of the data memory 31a. Subsequently, the processor 31c performs the following operations to produce $I_U$ and $I_V$:

$$I_U = I \cdot \sin\theta \quad (10)$$

$$I_V = I \sin\left(\theta + \frac{2\pi}{3}\right) \quad (11)$$

Thereafter, $I_U$ and $I_V$ are subjected to a DA conversion by DA converters 23 and 24 to be converted into analog U- and V-phase current commands $i_u$ and $i_v$. Next, an arithmetic circuit 32 performs the addition:

$$-(i_u + i_v) \rightarrow i_w \quad (12)$$

thereby producing a W-phase current command $i_w$.

Thenceforth, the three-phase current commands $i_u$, $i_v$ and $i_w$ are compared with the actual phase currents $i_{ua}$ and $i_{va}$, sensed by the respective current transformers 13 and 14, and the output $i_{wa}$ of the arithmetic circuit 15 with the inverter of the drive unit 17 being driven in accordance with the differences detected as in FIG. 4. It should be noted that portions similar to those shown in FIG. 5 are designated by like reference characters. Also, the operations given by equations (10) and (11) may be performed using multiplying-type DA converters, as shown in the conventional arrangement of FIG. 5.

Figure 7:
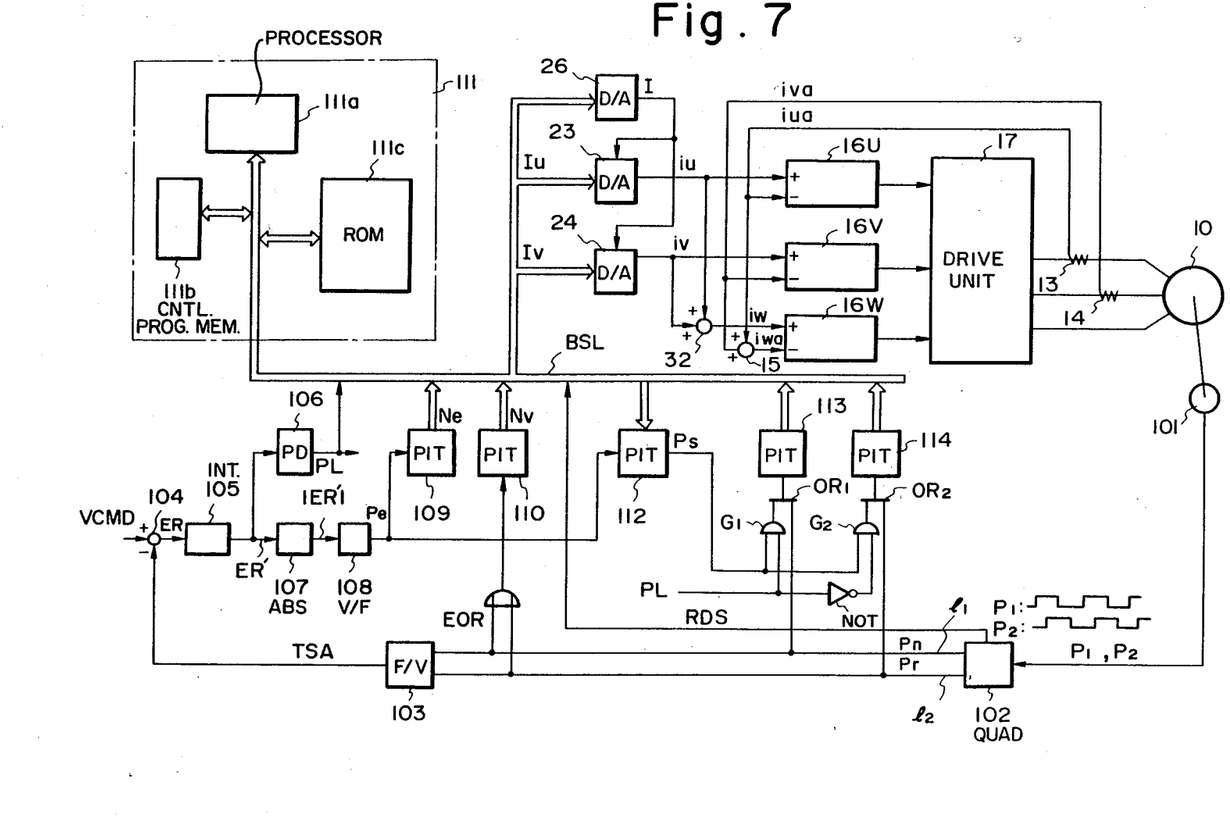
FIG. 7 is a block diagram of another embodiment of the present invention.

FIG. 7 is a block diagram illustrating another embodiment of the present invention. Portions similar to those shown in FIG. 6 are designated by like reference characters. In FIG. 7, numeral 10 denotes a three-phase induction motor and 101 a pulse generator for generating two pulse trains $P_1$ and $P_2$, displaced in phase from each other by $\pi/2$ and having a frequency $f_v$ proportional to the rotational speed of the three-phase induction motor. Numeral 102 denotes a quadrupling circuit for differentiating the pulse trains $P_1$ and $P_2$ to produce, on lines $l_1$ and $l_2$, respectively, pulse trains $P_n$ and $P_r$ of a quadrupled frequency $4 \cdot f_v$. The pulse train $P_n$ is generated during forward rotation, and the pulse train $P_r$ during reverse rotation. The quadrupling circuit 102 discriminates the phase difference between the pulse trains $P_1$ and $P_2$ to produce a rotational direction signal RDS. Numeral 103 denotes a frequency-to-voltage converter (referred to as an F/V converter hereinafter) which receives the pulse train $P_n$ or $P_r$ as an input for generating a voltage proportional to the frequency of the input pulse train, namely a voltage (referred to as actual speed TSA) proportional to the rotational speed.

Also in FIG. 7, numeral 104 designates an adding-/subtracting circuit for computing an error ER, namely slip s, between a speed command VCMD and the actual speed TSA. Numeral 105 denotes a proportional integrating circuit for proportionally integrating the speed error ER in an analog fashion for producing an error ER', 106 a polarity discriminating circuit for discriminating the polarity of the error ER', 107 an absolute value circuit, and 108 a voltage-to-frequency converter (referred to as a V/F converter) for producing a pulse train $P_e$ of a frequency proportional to the amplitude of the error ER'. Numerals 109 and 110 designate programmable interval timers (referred to as PIT hereinafter). PIT 109 increments its content for each of the pulses in the pulse train $P_e$ generated by the V/F converter 108 and is reset whenever its content is read by a processor 111a which will be described later. The numeral value $N_e$ held in the PIT 109 corresponds to the torque T. That is, the torque T is expressed by:

$$T = K_o \frac{sE_2^2 r_2}{r_2^2 + (sx_2)^2} \tag{13}$$

When s is small, T may be expressed thus:

$$T \approx \frac{sE_2^2}{r_2}$$

The torque T therefore is approximately proportional to the slip s or, in other words, is approximately proportional to the error ER.

The PIT 110 is adapted to increment its content for each pulse in the pulse train $P_n$ or $P_r$, whichever enters via an exclusive-OR gate EOR, and is reset whenever its content is read by the processor 111a. The content $N_v$ of PIT 110 conforms to the motor speed.

Figure 8:
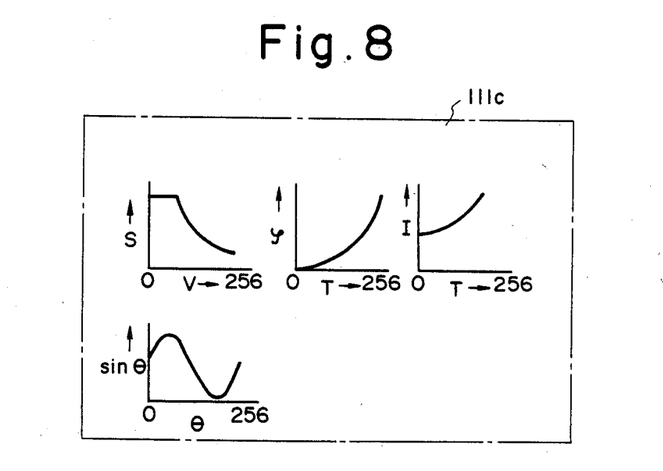
FIG. 8 is an explanatory describing various characteristics stored in a data memory.

Numeral 111 denotes a microcomputer having a processor 111a, a control program memory 111b, and a data memory (ROM) 111c for storing various characteristics and data, as described below. As illustrated in FIG. 8, the data memory 111c digitally stores, in the form of function tables, a torque-amplitude characteristic (T-I characteristic), torque-phase difference characteristic (T-$\phi$ characteristic), rotational speed-slip characteristic (V-S characteristic) and rotation angle-sine value characteristic (sine pattern). As for the T-$\phi$ characteristic, the phase difference $\phi$ may be expressed as follows:

$$\phi = \tan^{-1}\left(\frac{sx_2}{r_2}\right) \tag{14}$$

(where $r_2$ is the resistance of the secondary winding in one phase, $x_2$ is the reactance of the secondary winding in one phase when the induction 10 motor is at rest, and s is the slip). Taking into account that s is small, we have the characteristic shown in FIG. 8. In the T-I characteristic, the primary current $I_1$ is expressed as follows:

$$I_1 = I_o + I_{1'} \tag{15}$$

$$= I_o + \frac{1}{\alpha\beta} \frac{sE_2}{\sqrt{r_2^2 + (sx_2)^2}}$$

(where $I_o$ is the excitation current, $I_{1'}$ is the primary load current, $\alpha$ is the turns ratio, $\beta$ is the phase conversion ratio, and $E_2$ is the secondary induced electromotive force). Considering that s is proportional to T when the slip s is small, the characteristic is as shown in FIG. 8. As for the V-S characteristic (slip pattern), the slip s is constant below a base speed, and is inversely proportional to the motor speed above the base speed. The control program memory 111b stores a control program which instructs the processor 111a to execute such operations as reading the torque T, speed V and rotation angle $\theta$, described below, and controlling the slip frequency on the basis of T, V and $\theta$ and the function tables, etc.

Numeral 112 (FIG. 7) denotes a programmable interval timer (PIT) for frequency-dividing the pulse train $P_e$ generated by the V/F converter 108. The processor 111a reads the content $N_v$ (motor speed) of the PIT 110 at a fixed period and, using the V-S characteristic (slip pattern), derives a numerical value m which is proportional to the motor speed and which is loaded into the PIT 112. If we let the capacity of the PIT 112 be M, then the PIT 112 will deliver a single slip pulse $P_s$ each time (M-m)-number of pulses $P_e$ are generated. In other words, the pulse train $P_e$ is frequency-divided by (M-m) in the PIT 112. This adjusts the frequency of the pulses $P_s$ to the rate at which the pulse train $P_n$ or $P_r$ is generated, the frequency of these pulse trains being proportional to the rotational speed.

Numerals 113 and 114 denote interval timers (PITs) capable of counting in one direction only (incapable of decrementing). PIT 113 increments its content for each pulse of the forward rotation pulse train $P_n$ generated when the motor 10 is rotating in the forward direction, as well as for each of the slip pulses $P_s$. PIT 114 increments its content for each of the pulses of the reverse rotation pulse train $P_r$ generated when the motor 10 is rotating in the reverse direction, as well as for each of the slip pulses $P_s$. Assume that 256 of the pulses $P_n$ or $P_r$ are generated for one revolution of the motor 10, and assume that the capacity of each of the PITs 113 and 114 is 256. Then, subtracting the content $\theta_B$ of PIT 114 from the content $\theta_A$ of PIT 113 will give a value $\theta(=\theta_A-\theta_B)$ indicative of the commanded angular orientation which takes into account the load angle attributed to slip.

Gates in FIG. 7 include AND gates, $G_1$ and $G_2$, a NOT gate NOT, and OR gates $OR_1$ and $OR_2$. When the error ER' is positive (polarity signal PL="1"), AND gate $G_1$ opens to deliver the slip pulses $P_s$ solely to the PIT 113. When the error ER' is negative (polarity signal PL="0"), AND gate G₂ opens to deliver the slip pulses P_s solely to the PIT 114.

Numerals 23 and 24 designate multiplying-type digital/analog DA converters, and 26 denotes a DA converter. The DA converter 26 receives as an input the primary current amplitude (digital value) derived from the T-I characteristic, and produces an analog output signal I. The respective inputs to the multiplying-type DA converters 23 and 24 are the following sine waves (digital values) computed by the processor 111a:

$$I_U = \sin(\theta + \phi) \tag{16}$$

$$I_V = \sin\left(\theta + \phi + \frac{2\pi}{3}\right) \tag{17}$$

as well as the amplitude I from the DA converter 26. The DA converters 23 and 24 generate the following analog sine waves $i_u$ and $i_v$ having a predetermined amplitude:

$$i_u = I \cdot \sin\theta$$

$$i_v = I \cdot \sin\left(\theta + \frac{2\pi}{3}\right)$$

The arithmetic circuit 32 performs the operation of Eq. (12) to produce $i_w$. It should be noted that the data memory 111c does not store the characteristics $\theta$-sin $(\theta + 2\pi/3)$ and $\theta$-sin $(\theta + 4\pi/3)$. Accordingly, the first phase sine wave sin $\theta$ is obtained from the $\theta$-sin $\theta$ characteristic, after which the first phase sine wave sin $\theta$ is advanced or retarded in phase by $2\pi/3$ to generate the second phase sine wave.

The operation of the arrangement shown in FIG. 7 will now be described. When a speed command VCMD enters from a speed command device (not shown) the three phase induction motor 10 begins to rotate in the forward direction in accordance with the commanded speed VCMD. As the motor 10 rotates, the pulse generator 101 generates the first and second pulse trains P₁ and P₂ which are displaced in phase by $\pi/2$ from each other and proportional to the rotational speed of the motor 10. The quadrupling circuit 102, upon determining which of the pulse trains P₁ and P₂ leads the other, produces and sends the rotational direction signal RDC out on bus line BSL, sends the forward-rotation pulse train P_n out on line l₁ during forward rotation of the motor 10, and sends the reverse rotation pulse train P_r out on line l₂ during reverse rotation of the motor 10. Assuming that the motor 10 is rotating in the forward direction, the forward-rotation pulse train P_n will be applied to the F/V converter 103 and to the programmable interval timers 110 and 113 in which the pulses increment the content thereof.

The F/V converter 103 produces an actual speed signal TSA having a voltage proportional to the motor speed. The adding/subtracting circuit 104 produces the error ER between the speed command VCMD and the actual speed TSA. The error ER is proportionally integrated by the proportional integrating circuit 105 for conversion into the error ER' which is applied to the polarity discriminating circuit 106 and absolute value circuit 107. The polarity discriminating circuit 106 delivers a polarity signal PL on bus line BSL based on the polarity (sign) of ER'. The absolute value circuit 108 produces |ER'|, namely the absolute value of ER'. The absolute value |ER'| is applied as an input signal to the V/F converter 108 which proceeds to produce an error pulse train P_e having a frequency proportional to |ER'|. The pulse train P_e is used to increment the programmable interval timer (PIT) 109. The counter value N_e in the PIT 109 is a numerical value which corresponds to the torque T, as mentioned above. The processor 111a read periodically reads this value N_e.

Meanwhile, the counted value N_v in the programmable interval timer (PIT) 110 corresponds to the rotational speed of the motor 10 and is read in the same manner as the content N_e (torque T) of PIT 109 by the processor 111a, PIT 110 being reset whenever its content is read. Whenever the processor 111a reads the content N_v (rotational speed) of PIT 110, the processor 111a, under the control of the control program, obtains the numerical value m, corresponding to the rotational speed, from the function table of the V-S characteristic (slip pattern), and loads the numerical value m into the PIT 112. The programmable interval timer (PIT) 112 also receives the pulse train P_e delivered by the V/F converter 108 and frequency-divides this pulse train by (M-m), as described above, thereby converting it into the slip pulse train P_s.

The pulses in the slip pulse train P_s are used to increment the programmable interval timer 113, the pulse train Ps passing through the AND gate G₁ (when PL="1") and OR gate OR₁. The programmable interval timer (PIT) 113 counts the forward-rotation pulses P_n in addition to the slip pulse train P_s, so that its content $\theta_A$ represents the total forward rotation angle. Similarly, the content $\theta_B$ of the programmable interval timer 114 represents the total reverse rotation angle.

Processor 111a reads $\theta_A$ and $\theta_B$ at a fixed period and performs the operation $\theta = \theta_A - \theta_B$ each time it does so. The quantity $\theta$ is the acurrent ngular orientation of the motor 10.

Thenceforth, the processor 11a, under the control of the control program, obtains the sine waves I_U and I_V, expressed by Eqs. (16) and (17), and the primary current amplitude I, using the T-$\phi$ characteristic, the T-I characteristic and the sine pattern, which are stored in the data memory 111c, as well as the computed rotation angle $\theta$. The processor delivers I_U, I_V and I to the multiplying-type DA converters 23 and 24 and to the DA converter 26, respectively, whereby analog sine waves $i_u$ and $i_v$ of a predetermined amplitude are produced. In consequence, the arithmetic circuit 32 performs the operation of Eq. (12) to generate $i_w$. Thereafter, the three-phase current commands $i_u$, $i_v$ and $i_w$ are compared with the actual phase currents $i_{ua}$ and $i_{va}$ sensed by the current transformers 13 and 14, and the output $i_{wa}$ of the arithmetic circuit 15, repectively, and the inverter in the drive unit 17 is controlled in accordance with the error to supply the three-phase induction motor 10 with the three-phase current of a predetermined frequency and amplitude.

Thus, in accordance with the present invention, the circuitry is simplified and costs reduced because it suffices to provide a ROM 111c for storing a table (the $\theta$-sin $\theta$ table) for function generation for one phase only, and DA converters 23 and 24 for two phases. Further, since the W-phase current command $i_w$ is generated to satisfy the relation $i_u + i_v + i_w = 0$, there is no fluctuation and periodic undulation in response to motor rotation, so that the invention is well-suited for application to three-phase induction motor drive.

What is claimed is:

1. An induction motor drive apparatus which produces three-phase current commands from a speed error signal in accordance with a speed error between a speed command and an actual speed and controls a drive unit for driving an induction motor on the basis of the three-phase current commands, comprising:

angle means, operatively connected to the induction motor, for finding an angle of rotation of the induction motor (angle $\theta$);

sinusoidal signal generating means, operatively connected to said angle means and to receive the speed error signal and the actual speed, for generating, through digital processing, first and second phase sinusoidal signals, comprising:

a memory for storing a relation between the angle $\theta$ and sin $\theta$, a torque-amplitude characteristic, a torque-phase difference characteristic and a rotational speed-slip characteristic;

a processing unit, operatively connected to said angle means and said memory, for obtaining a first digital sine wave sin $\theta$ corresponding to the first phase sinusoidal signal, and for shifting the phase of the first digital sine wave by $2\pi/3$ to generate a second digital sine wave corresponding to the second phase sinusoidal signal;

third phase means, operatively connected to the drive unit and said sinusoidal signal generating means, for generating a third phase sinusoidal signal, using the first and second phase sinusoidal signals where the first, second and third phase sinusoidal signals have a sum equal to zero;

a first digital/analog converter, operatively connected to said third phase means and said processing unit, for converting the first digital sine wave into the first phase sinusoidal signal; and a second digital/analog converter, operatively connected to said third phase means and said processing unit, for converting the second digital sine wave into the second phase sinusoidal signal; and speed error signal means, operatively connected to the induction motor and said processing unit, for generating signals representing the actual speed and the torque of the drive unit, comprising:

position sensing means, operatively connected to the induction motor, for sensing a position change of the induction motor;

error detecting means, operatively connected to said position sensing means and to receive the speed command, for generating the speed error signal;

torque detecting means, operatively connected to said error detecting means, said angle means and said processing unit, for detecting a torque generated by the induction motor; and speed detecting means, operatively connected to said position sensing means and said processing unit, for detecting the actual speed of the induction motor.

2. An induction motor drive apparatus according to claim 1, wherein said position sensing means comprises:

a pulse generator, operatively connected to the induction motor, for generating a first pulse train and a second pulse train phase shifted by $\pi/2$ from the first pulse train; and a quadrupling circuit, operatively connected to said pulse generator and said angle means, for frequency multiplying the first and second pulse trains by four, determining from the first and second pulse trains whether the induction motor is rotating in a forward direction or a reverse direction and outputting a rotational direction signal, a forward pulse train when the induction motor is rotating in the forward direction and a reverse pulse train when the induction motor is rotating in the reverse direction, wherein said error detecting means comprises:

a frequency-to-voltage converter, operatively connected to said quadrupling circuit, for converting the forward and reverse pulse trains into an actual speed voltage; and an adding/subtracting circuit, operatively connected to said frequency-to-voltage converter and to receive the speed command, for generating the speed error signal, wherein said torque detecting means comprises:

a proportional integrating circuit, operatively connected to said adding/subtracting circuit, for proportionally integrating the speed error signal;

a polarity discriminating circuit operatively connected to said processing unit and said proportional integrating circuit;

an absolute value circuit operatively connected to said proportional integrating circuit;

a voltage-to-frequency converter, operatively connected to said absolute value circuit, for generating an error pulse train; and a first programmable interval timer, operatively connected to said processing unit and said voltage-to-frequency converter, for counting the pulses of the error pulse train to produce a digital torque value, and wherein said speed detecting means comprises:

an exclusive OR gate operatively connected to said quadrupling circuit; and a second programmable interval timer, operatively connected to said processing unit and said exclusive OR gate, for counting the pulses of the forward and reverse pulse trains to produce a digital speed value.

3. An induction motor drive apparatus according to claim 2, wherein said angle means comprises:

a third programmable interval timer, operatively connected to said processing unit and said voltage-to-frequency converter, for generating a slip pulse train by frequency dividing the error pulse train;

a first AND gate operatively connected to said polarity discriminating circuit and said third programmable interval timer;

a first OR gate, operatively connected to said quadrupling circuit and said first AND gate, receiving the output of said first AND gate and the forward pulse train as inputs;

a fourth programmable interval timer, operatively connected to said processing unit and said first OR gate, for counting the pulses of the slip pulse train when the speed error signal has a positive polarity and for counting the pulses in the forward pulse train;

a NOT gate operatively connected to said polarity discriminating circuit;

a second AND gate operatively connected to said third programmable interval timer and said NOT gate;

a second OR gate, operatively connected to said quadrupling circuit and said AND gate, receiving as inputs the output of said second AND gate and the reverse pulse train; and a fifth programmable interval timer, operatively connected to said processing unit and said second OR gate, for counting the pulses in the slip pulse train when the polarity of the speed error signal is negative and for counting the pulses in the reverse pulse train.

* * * * *

UNITED STATES PATENT AND TRADEMARK OFFICE
CERTIFICATE OF CORRECTION

PATENT NO. : 4,558,269
DATED : December 10, 1985
INVENTOR(S) : ISHIDA ET AL.

It is certified that error appears in the above-identified patent and that said Letters Patent is hereby corrected as shown below:

Front page, [57] ABSTRACT, line 11, delete "a phase current";
line 12, delete "($i_w$) in a".

Column 2, line 50, "and" (second occurrence) should be --an--.
Column 3, line 17, "in a" should be --in an internal--;
line 18, delete "located internally".
Column 4, line 15, "is an explanatory" should be
--contains graphs--.
Column 6, line 8, "10 motor" should be --motor 10--.
Column 8, line 38, "accurrent ngular" should be
--current angular--;
line 40, "11a" should be --111a--.

Signed and Sealed this

First Day of April 1986

[SEAL]

Attest:

DONALD J. QUIGG

Attesting Officer

Commissioner of Patents and Trademarks